United States Patent [19]

Matsui et al.

[11] Patent Number: 4,843,227

[45] Date of Patent: Jun. 27, 1989

[54] FOCUS DETECTING APPARATUS WITH BOTH PASSIVE AND ACTIVE FOCUS CAPABILITY

[75] Inventors: Toru Matsui; Kazuo Kimura, both of Sakai, Japan

[73] Assignee: Minolta Camera Kabushiki Kaisha, Osaka, Japan

[21] Appl. No.: 95,524

[22] Filed: Sep. 11, 1987

[30] Foreign Application Priority Data

Sep. 11, 1986 [JP] Japan .................................. 61-215424
Sep. 26, 1986 [JP] Japan .................................. 61-228685

[51] Int. Cl.$^4$ .............................................. G03B 3/00
[52] U.S. Cl. ..................................... 250/201; 354/402; 354/403; 354/406
[58] Field of Search ................ 250/201, 204; 354/402, 354/403, 406, 409, 407; 356/1, 4

[56] References Cited

U.S. PATENT DOCUMENTS

| | | | |
|---|---|---|---|
| 4,357,085 | 11/1982 | Niwa et al. | 354/403 |
| 4,455,065 | 6/1984 | Niwa et al. | 356/4 |
| 4,560,863 | 12/1985 | Matsumura et al. | 354/407 |
| 4,563,576 | 1/1986 | Matsumura et al. | 250/204 |
| 4,632,532 | 12/1986 | Matsumura et al. | 354/403 |
| 4,636,624 | 1/1987 | Ishida et al. | 250/201 |
| 4,636,627 | 1/1987 | Matsumura | 354/407 |
| 4,687,917 | 8/1987 | Kusaka et al. | 250/204 |

*Primary Examiner*—Edward P. Westin
*Attorney, Agent, or Firm*—Burns, Doane, Swecker & Mathis

[57] ABSTRACT

A focus adjusting system is provided with both a passive AF capability wherein ambient light is utilized and an active AF capability wherein an LED element for projecting light off the optical axis of a photo-taking lens and light reflected from an object after having been projected by the LED element are utilized. The focus detecting apparatus includes a secondary image forming element and an aperture opening disposed in the vicinity of the secondary image forming element. The aperture opening is symmetrically positioned relative to the optical axis of the photo-taking lens and lies on a straight line which contains the optical axis of the photo-taking lens and which is perpendicular to a straight line connecting the optical axis of the photo-taking lens and a projecting light optical axis. The aperture opening has a pair of inner regions and a pair of outer regions. A first cut-off filter having a property of cutting off rays of light of a wave-length projected from the LED element is provided. First and second AF sensors are adapted to receive the light, which has passed through at least the pair of the outer regions of the aperture opening, and the light which has passed through the pair of the inner regions of the aperture opening, respectively. A second cut-off filter is also provided, having a property substantially identical with that of the first cut-off filter and disposed on the second AF sensor.

10 Claims, 5 Drawing Sheets

$\theta_1 = 2.6°$ (FNO = 11)
$\theta_2 = 4.1°$ (FNO = 7)

FOCUS DETECTING APPARATUS WITH BOTH PASSIVE AND ACTIVE FOCUS CAPABILITY

BACKGROUND OF THE INVENTION

1. FIELD OF THE INVENTION

The present invention relates to a focus detecting apparatus having both a passive focus detection feature and an active focus detection feature, and being suited for use in a photographic camera, such as a single reflex camera, having an interchangeable lens capability.

2. DESCRIPTION OF THE PRIOR ART

A passive focus detecting apparatus suitable for use in a camera of the type referred to above is disclosed in, for example, the Japanese Laid-open Patent Publication No. 57-74423 first published in 1982. In this passive focus detecting apparatus, the focus detecting optical system is required to be so arranged and so constructed that the light flux received will not be vignetted by the exit pupil of the photo-taking lens. However, a variety of interchangeable lenses are available for a single reflex camera and the position and the size of the exit pupil varies from one interchangeable lens to another. Therefore, in order for the focus detection to be possible with any one of the available interchangeable lenses, the light flux must be received at a region adjacent the optical axis. However, this setting tends to bring about the following problem. Specifically, when the focus detection is carried out by causing the above mentioned focus detecting apparatus to receive light which has been projected onto an object through the photo-taking lens and subsequently reflected back from the subject, as when the active automatic focus (i.e., active AF) is carried out, it is difficult to avoid receiving harmful light which has been reflected between the surfaces of lens elements of the photo-taking lens and then returned toward the focus detecting apparatus without having been projected onto the object. On the other hand, since the number of usable lenses will be limited if the light flux to be received is so positioned and arranged as to be remote from the optical axis, the photo-taking region (the number of lenses usable) during the passive AF is limited to a value smaller than that hitherto available.

Japanese Laid-open Patent Publications No. 54-155832 and No. 57-22210 published in 1979 and 1982, respectively, disclose a focus detecting optical system wherein light emitted by a light projecting means is projected onto an object to be photographed through a portion of the photo-taking lens. The reflected light from the object is then received by a focus detecting means through a different region of the photo-takng lens. In the principal plane of the photo-taking lens, the optical axis for the projecting light and the optical axis for the receiving light do not assume a point-to-point symmetry with respect to the point of intersection between the principal plane of the phototaking lens and the optical axis of the photo-taking lens. In other words, the optical axis for the projecting light and the optical axis for the receiving light do not assume a point-to-point symmetry with respect to the optical axis of the photo-taking lens in the principal plane of the photo-taking lens, which avoids any possible influence which would be brought about by the harmful light. However, as hereinbefore described, a variety of interchangeable lenses having different minimum F-numbers and/or different focal lengths are available for a single reflex camera. In order for the focus detecting apparatus to be adaptable to any one of these interchangeable lenses, the receiving light flux must necessarily be received at a position adjacent the optical axis of the photo-taking lens. By way of example, where coverage is desired to be extended to the photo-taking lens having the minimum F-number of F. No.=5.6, a design must be made to receive the light flux of about F.No.$\geq$7, even though the difference in position of the exit pupil among the individual photo-taking lenses, an error in adjustment of the focus detecting apparatus and the accuracy of fitting of the photo-taking lens to the camera body are taken into consideration. When the F-number of 7 is expressed in terms of the angle $\theta$ from the optical axis of the photo-taking lens, the angle $\theta$ will be about 4.1°. Assuming that the light flux of an F-number within the range of 7 to 11 is used as the receiving light flux, the angle $\theta$ will be within the range of about 4.1° to 2.6°, the smallest angle $\theta$ being 2.6°. (See FIG. 10).

It is well known from, for example, the above mentioned Japanese Publication No. 57-22210 that a region of the harmful light radiated from a point on the optical axis of the photo-taking lens and reflected toward the focus detecting apparatus after having been reflected by a surface of the photo-taking lens assumes a point-to-point symmetry with respect to the optical axis of the photo-taking lens. Since the area in which the point-to-point symmetry takes place depends on the size of a source of light to be projected and the angle of the projecting light flux, it is necessary to reduce the size of the projecting light source and the angle of the projecting light flux if it is desired to reduce the area; that is, if it is desired to avoid having the harmful light fall on the focus detecting sensor.

The harmful light received on a light receiving surface is shown in FIG. 11. The size of the projecting light source is mainly related to the size x of the harmful light, and the angle of the reflected light flux is mainly related to the angle of spread of the harmful light. Summarizing the above, when the angle (to shown in FIG. 10 of the receiving light flux incident uponthe focus detecting apparatus becomes smaller, it becomes more necessary to reduce the size of the projecting light source and the angle of the projecting light flux. However, where the receiving light flux is received at a region adjacent the optical axis of the photo-taking lens as hereinbefore discussed, the error in adjustment of the focus detecting apparatus, the error in accuracy of fitting the photo-taking lens to the camera body and the error in eccentricity of the photo-taking lens itself make it difficult to avoid the harmful light. Also, the excessive reduction in size of the projecting light source and the angle of the projecting light flux would result in an excessive reduction in the amount of light to be projected, rendering the distance over which the distance measurement is possible to be small.

The Japanese Laid-open Patent Publications No. 59-40610, No. 59-65814, No. 59-129810, No. 59-129812 and No. 59-195607, all published in 1984, disclose an arrangement wherein at least two sets of light deflecting members are disposed in a secondary image forming system so that rays of light from outside of the exit pupil of the photo-taking lens and rays of light from inside thereof can form respective images at different positions on a substrate for a light receiving element. An arrangement has also been made whereby a set of light receiving elements for receiving the rays of light from the outside of the exit pupil and a set of light receiving elements for receiving the rays of light from the inside of the exit pupil can be switched over selectively depending on the aperture value of the photo-taking lens. According to this system, the light deflecting members are used as a means for differentiating the rays of light from the outside of the exit pupil and those from the inside of the exit pupil. Since they merely divide the exit pupil into an inside region and an outside region, no consideration has been given to the harmful light which would occur during the previously discussed active AF. By way of example, the light dividing means, the image of which has been formed in the vicinity of the exit pupil of the photo-taking lens by a field lens, is shown in FIG. 12. Referring to FIG. 12, reference characters 1a, 1b and 2a, 2b represent images of two light deflecting portions of the light dividing means projected in the vicinity of the exit pupil of the photo-taking lens, which images represent a generally square shape since the overall shape of the light deflecting member is square. With this shape, it is clear that the harmful light cannot be effectively eliminated even with the rays of light passing through the outside of the exit pupil. Moreover, since the light deflecting members are used, there may arise harmful light which would be reflected by an edge portion of the light deflecting member. For this reason, there is a problem in that the outside portion and the inside portion cannot be brought close to each other (the outside portion must be set outside more than necessitated).

The Japanese Laid-open Patent Publication No. 60-98413, published in 1985, discloses an arrangement wherein the pupil of the photo-taking lens is divided into first to third pupil areas by a dividing means, the first pupil area being used to pass a projecting light flux therethrough so as to be projected onto the object to be photographed through a central area of a focus detection field opening, and wherein an image of the object formed by the photo-taking lens within the focus detection field opening is formed on a plurality of separate sensors through the second and third pupil areas. According to this publication, the optical axis of the light projecting system is positioned within a plane delimited by the longitudinal direction of the focus detection field opening and the optical axis of the photo-taking lens. Both the projecting light region and the receiving light region are positioned outside the area of point-to-point symmetry with respect to the optical axis of the photo-taking lens. In other words, as shown in FIG. 13, the first pupil area which is the projecting light region and the second and third pupil areas which are the receiving light region are set so as to divert from the substantially symmetrical relationship with respect to a vertical line component perpendicular to the optical axis of the photo-taking lens. Accordingly, it is not suited for use in carrying out AF with the photo-taking lens having a relatively large minimum F-number. In other words, reduction in size of the light receiving region results in reduction of the amount of light received, which is undesirable, particularly for the active AF.

SUMMARY OF THE INVENTION

The present invention has been devised with a view to substantially eliminating the above described problems inherent in the prior art systems. The essential object of this invention is to provide an improved focus detecting apparatus of both an active and passive type, which is operable with an increased number of photo-taking lenses having an AF capability, that is, an improved focus detecting apparatus wherein, even when a TTL active AF is provided, no limitations occur in the type of photo-taking lens used during the passive AF.

It is a related object of the present invention to provide an optical filter utilizable in the improved focus detecting apparatus of the type referred to above.

In order to accomplish this object of the present invention, there is provided a focus detecting apparatus for detecting the focusing condition of a photo-taking lens. The apparatus is comprised of a means for projecting light, which has a predetermined wavelength range, toward an object to be focused through the photo-taking lens. The projected light has a projection optical axis different from the optical axis of the objective lens. The apparatus also has a means, located at the image side of a predetermined focal plane of the photo-taking lens, for forming a secondary image of an image formed on the predetermined focal plane of the photo-taking lens, and a means, located nearby the secondary image forming means, for limiting light passed therethrough, the light limiting means including an aperture mask having a pair of aperture openings. Each of the aperture openings is positioned in a symmetrical arrangement with respect to the optical axis of the photo-taking lens and with respect to a line which includes the optical axis of the photo-taking lens and which is perpendicular to another line that connects the optical axis of the photo-taking lens with the projection optical axis. The pair of the aperture openings is further defined by a pair of inner regions and a pair of outer regions. The apparatus further includes a means, located at the optical paths passed through the inner regions of the aperture openings for cutting off light having the predetermined wavelength range, and a means, located at a predetermined focal plane of the secondary image forming means, for receiving light passed through the secondary image forming means, the light limiting means, and the light cutting off means.

BRIEF DESCRIPTION OF THE DRAWINGS

These and other objects and features of the present invention will become clear from the following description taken in conjunction with preferred embodiments of the present invention with reference to the accompanying drawings, in which.

DETAILED DESCRIPTION OF THE EMBODIMENT

Figure 1A:
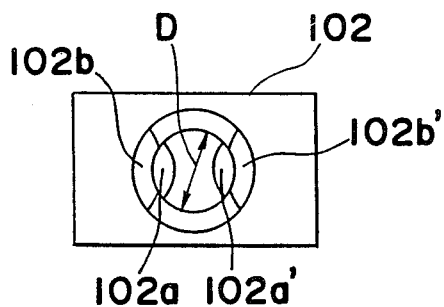
FIGS. 1(a) to 1(d) are schematic front elevational views showing an aperture mask, an interference film, an image forming lens and a focus detecting line sensor all used in a focus detecting apparatus, respectively.

Before the description of the preferred embodiment proceeds, it is noted that like parts are designated by like reference numerals throughout the accompanying drawings.

Figure 2:
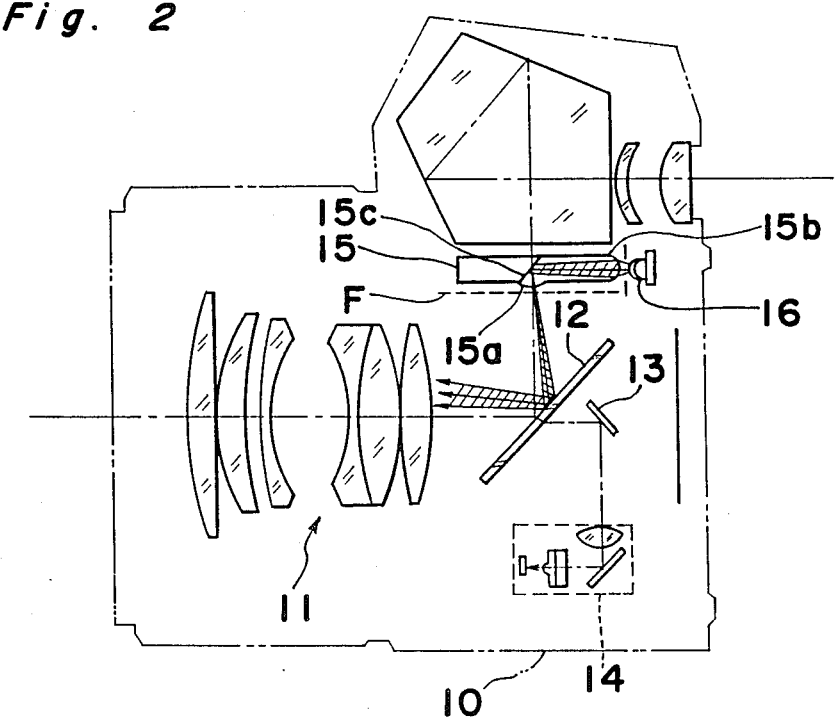
FIG. 2 is a schematic side sectional view of a single reflex camera provided with the focus detecting apparatus.

Referring to FIG. 2 which illustrates a single reflex camera with a focus detecting apparatus having a combination of passive and active AF capabilities. The camera comprises a camera body 10 with an interchangeable photo-taking lens 11 mounted thereon in any known manner. The camera body 10 has built therein a reflex mirror 12 for deflecting rays of light which have passed through the photo-taking lens 11, towards a viewfinder and also for allowing a portion of the light rays to pass therethrough towards a focus detecting apparatus 14. The camera body 10 also has built therein a reflecting mirror 13 for deflecting that portion of the light rays which have passed through the reflex mirror 12, towards the focus detecting apparatus 14. Positioned within the camera body at a location between the reflex mirror 12 and the viewfinder is a light projecting optical member 15 having such a shape as shown, said optical member 15 being comprised of convex surfaces 15a and 15b and a half-mirror surface 15c. The convex surfaces 15a and 15b constitute respective lenses and are used to focus rays of light, which have been projected by a light emitting diode 16, on a position lying on the optical axis of the photo-taking lens 11 and in the vicinity of a predetermined focal plane F. The half-mirror surface 15c is used to reflect the rays of light of a wavelength emitted from the light emitting diode 16, but allows visible rays of light therethrough, and is inclined at an angle required for the light rays emanating from the light emitting diode 16 to be inclined at a predetermined angle relative to the optical axis of the photo-taking lens. The light emitting diode 16 is so positioned as to assume a face-to-face relationship with convnex surface 15b.

Figure 3:
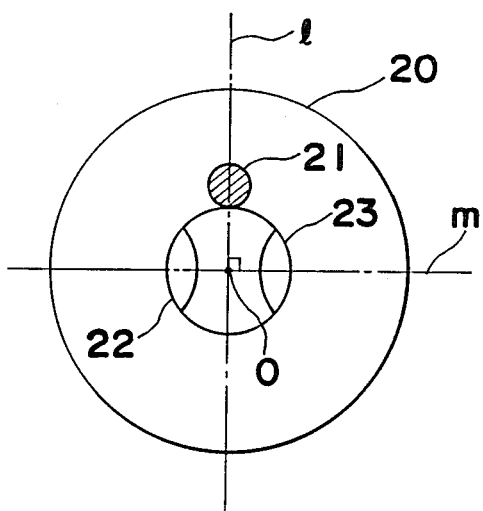
FIG. 3 is a diagram illustrating the relationship between projecting light regions and receiving light regions on a plane of th exit pupil of the photo-taking lens.

FIG. 3 illustrates the relationship between the projecting light region and the receiving light region according to the present invention as projected on a plane of the exit pupil of the photo-taking lens 11. Referring to FIG. 3, reference numeral 20 represents an exit pupil of the photo-taking lens, reference numeral 21 represents a projecting light flux region, and reference numerals 22 and 23 represent respective light receiving regions. Assuming that a straight line drawn so as to pass both the optical axis 0 of the photo-taking lens and the center of the projecting light flux region 21 is expressed by l and a line drawn so as to pass both the optical axis 0 of the photo-taking lens, and the receiving light flux regions 22 and 23 is expressed by m, the relationship between the projecting light flux and the receiving light flux is so determined as to be $l \perp m$. The relationship of harmful light caused by surface reflection of the photo-taking lens in the event that the projecting light region and the receiving light regions are so set as to assume the foregoing relationship is illustrated in FIG. 4.

Figure 4:
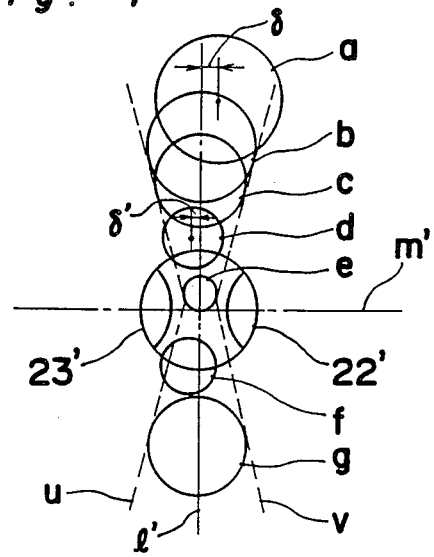
FIG. 4 is a diagram illustrating the harmful light present on the aperture mask.

FIG. 4 is a diagram showing the harmful light caused by intersurface reflection in the photo-taking lens. Reference numerals 22' and 23' represent respective aperture mask openings on a plane of an aperture mask, and reference numerals 22 and 23 shown in FIG. 3 represent respective images of the aperture mask openings 22' and 23' formed by a condenser lens on a plane of the exit pupil of the photo-taking lens. In FIG. 4, center lines l' and m' of symmetry in respective longitudinal and transverse directions with respect to the aperture mask opening 22' and 23' assume respective relationships l'//l and m'//m relative to associated center lines l and m in FIG. 3. Reference characters a, b, ... f and g represents harmful light caused by the surface reflection in the photo-taking lens, and the displacement δ or δ' and others represent the amount of error resulting from the eccentricity of surfaces of lenses constituting the photo-taking lens.

Figure 5:
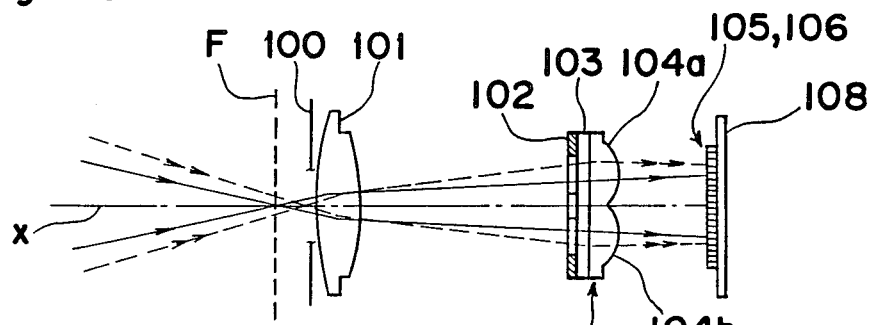
FIG. 5 is a schematic side sectional view of a focus detecting optical system according to the present invention.

FIG. 5 illustrates one embodiment of a focus detecting optical system suited for the purpose of the present invention. FIGS. 1(a) to 1(d) are front elevational views of respective portions of the focus detecting opticl system shown in FIG. 5. Referring now to FIG. 5, reference character X represents an optical axis of the photo-taking lens and reference character F represents a predetermined focal plane. Reference numeral 100 represents a field mask disposed in the vicinity of the predetermined focal plane F and utilized to restrict the light flux incident upon the focus detecting optical system. Positioned on one side of the field mask 100 opposite to the predetermined focal plane F is a condenser lens 101 which has a refractive power sufficient to cause an image of an aperture mask 102 to be formed in the vicinity of the exit pupil of the photo-taking lens.

The aperture mask 102 is disposed rearwardly of the condenser lens 101 and has defined therein inner and outer pairs of generally oval-shaped aperture openings, the inner pair of the aperture openings being identified by 102a and 102a' and the outer pair of the aperture openings being identified by 102b and 102b', as shown in FIG. 1(a).

Figure 1B:
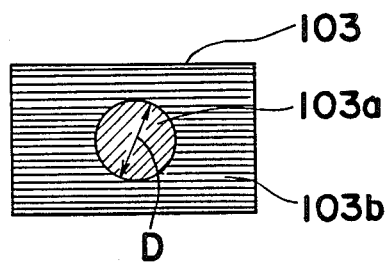
Figure 1C:
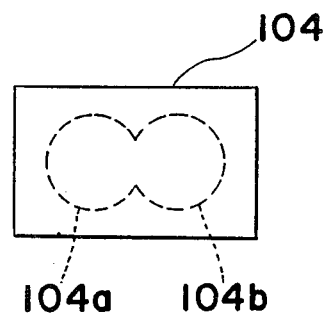

Reference numeral 103 represents an achromatic transparent glass substrate that is, as shown in FIG. 1(b), vapor-deposited with an interference film 103a at a central circular area of a diameter D and also with another interference film 103b exteriorly of the intnerference film 103a, said interfernce film 103b having a property different from that of the interference film 103a. The diameter D of the interference film 103a is so selected as to be equal to the diameter of the circumscribed circle containing the inner pair of the aperture openings 102a and 102a'. The aperture mask 102 and the glass substrate 103 are fixedly held in contact with each other with the diameters of the interference film 103a and the circumscribed circle aligned exactly concentric with each other. The interference film 103a reflects rays of light of a wavelength emitted by the light emitting diode 16, but allows rays of light of a wavelength other than the wavelength emitted by the light emitting diode 16 to pass through. The purpose of this is to prevent the rays of light projected by the light emitting diode 16 from entering the focus detection line sensor after having been reflected by the surfaces of the lenses constituting the photo-taking lens. It is the interference film 103a that constitute the near infrared cut-off filter referred to in the present invention. On the other hand, the interference film 103b is formed as an interference film which allows the rays of light emitted by the light emitting diode 16 to pass through, or rays of light of a wide range of longer wavelength including the rays of light emitted by the light emitting diode 16. That is, the interference film 103b constitutes the visible light cut-off filter referred to in the present invention. As shown in FIG. 4, the harmful light caused by the surface reflection in the photo-taking lens is the smallest on the optical axis of the photo-taking lens. It increases with an increase in distance from the optical axis and, therefore, the outer pair of the aperture opening 102b and 102b' for the active AF are so shaped as to have a width of opening progressively narrowed in a direction upwardly and downwardly away from the optical axis of the photo-taking lens as shown in FIG. 1(a). Reference numeral 104 represents an achromatic transparent plastics member provided on a surface of the glass substrate 103 opposite to the aperture mask 102. As shown in FIG. 1(c), this plastics member 104 is formed with two image forming lenses 104a and 104b, the image forming lens 104a being operable to focus the rays of light, which have passed through the aperture opening 102a and 102b, on respective focus detecting line sensors 105 and 106 as will be described later, while the image forming lens 104b is operable to focus the rays of light, which have passed through the aperture openings 102a' and 102b, on the sensors 105 and 106. It is to be noted that the image forming lenses 104a and 104b are so formed as to have an equal refractive power.

Each of the line sensors 105 and 106 is disposed on an image forming plane of the image forming lenses 104a and 104b and is employed in the form of a one dimensional line sensor such as, for example, a charge-coupled device (CCD). As shown in FIG. 1 (d), the line sensor 106 is located at a position passing through the optical axis of the photo-taking lens, and the line sensor 105 is disposed parallel to the line sensor 105 and located at a position slightly spaced from the optical axis of the photo-taking lens. A surface of the line sensor 105 is covered by a filter (a near infrared light cut-off filter) 107 which absorbs only the rays of light of the wavelength emitted by the light emiting diode 16. Thus, the visible rays of light which have passed through the aperture openings 102a and 102a' and tramsitted through the interference film 103a, the images of which have subsequently been formed by the image forming lenses 104a and 104b, can be projected onto the line sensor 105. On the other hand, in addition to the visible rays of light, the rays of light which have passed through the aperture openings 102b and 102b' and have been transmitted through the interference film 103b, can be projected onto the line sensor 106. In other words, while the line sensor 105 effectively receives only the visible rays of light, the line sensor 106 is so constructed as to receive both the visible rays of light and the rays of light of the wavelength (the near infrared range is usually used) emitted by the light emitting diode 16. Accordingly, the line sensor 105 constitutes a line sensor for the passive AF whereas the line sensor 106 constitutes a line sensor for the active AF. It is to be noted that a visible light cut-off filter may be disposed in front of the line sensor 106 for totally cutting the visible rays of light off.

Figure 6:
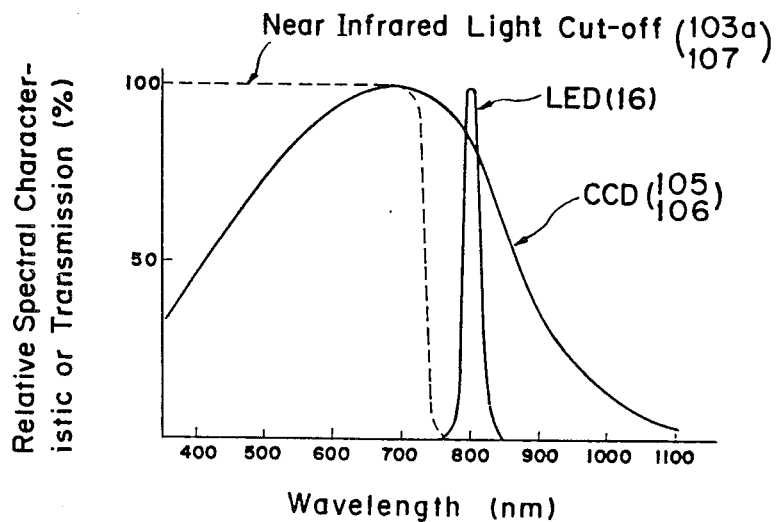
FIG. 6 is a graph illustrating the transmission characteristics and the special characteristics of the near infrared cut-off filter, a light emitting diode and the focus detecting line sensor.

Only for the purpose of illustration, characteristics of the light emitting diode, the focus detecting line sensors and the filters, respectively, are shown in FIG. 6.

Figure 1D:
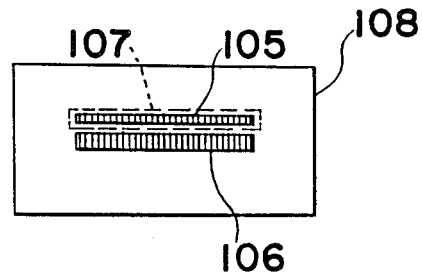
Figure 7:
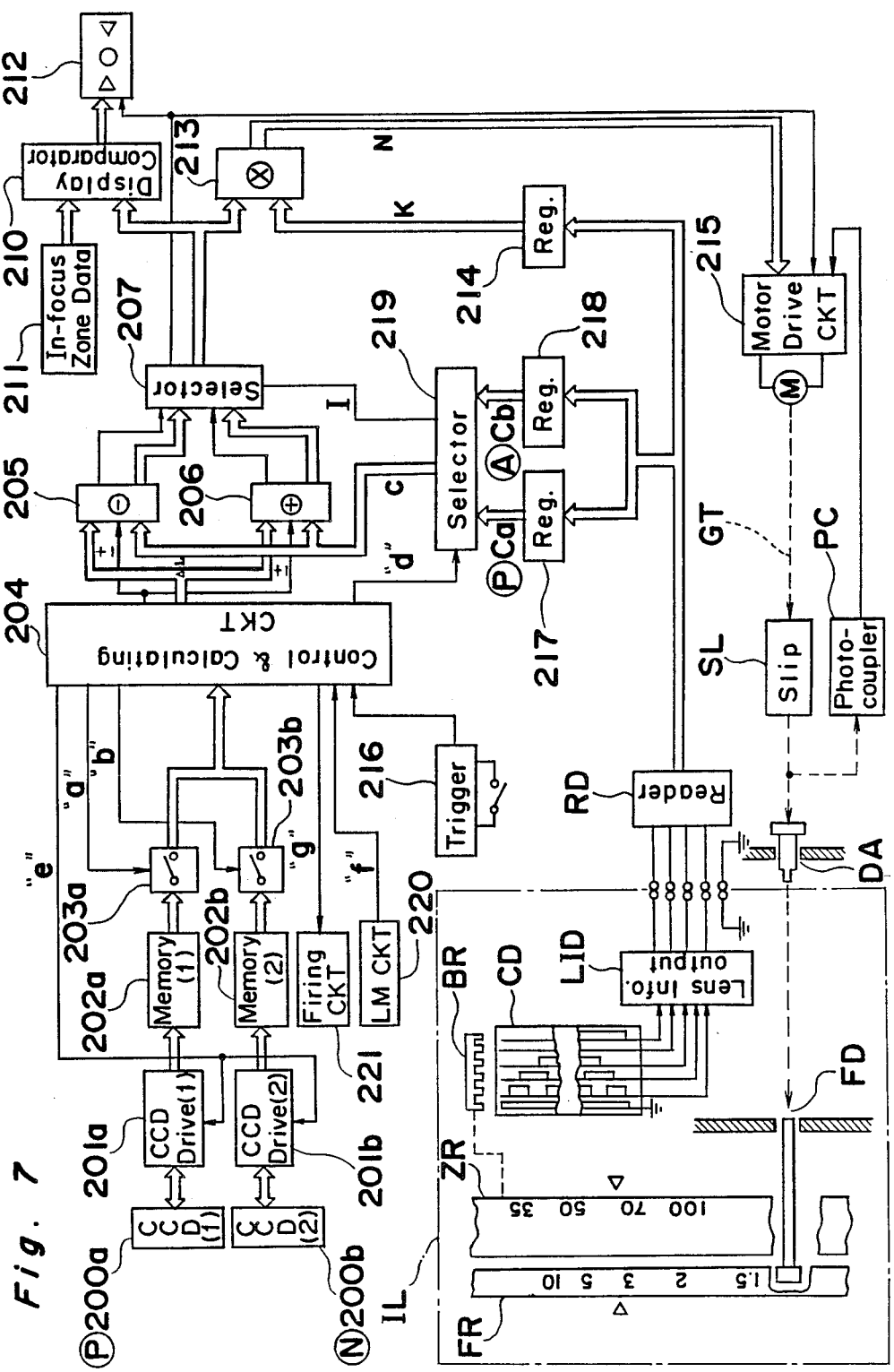
FIG. 7 is a circuit block diagram showing an AF system.

FIG. 7 illustrates an automatic focusing system utilizing the focus detecting apparatus wherein the near infrared light cut-off filter 107 is provided on the focus detecting line sensor 105 as shown in FIG. 1(d), the details of which will be described below.

Reference numeral 200a represents a focus detecting line sensor (corresponding to the element 105 shown in FIG. 1(d)) for the passive AF, and reference numeral 200b represents a focus detecting line sensor (corresponding to the element 106 shown in FIG. 1(d)) for the TTL active AF. Reference numerals 201a and 201b represent respective CCD drive circuits operable to convert analog signals from the associated line sensors 200a and 200b into digital signals and then output these digital signals and also to output signals necessary to drive the line sensors 200a and 200b. The CCD drive circuits 201a and 201b are in turn connected with respective digital memory circuits 202a and 202b which store the digital signals outputted from the associated CCD drive circuits 201a and 201b. Reference numerals 203a and 203b represent respective gating circuits, one for each digital memory circuit 202a or 202b, respectively. When an associated signal outputted to a signal line a or b from a control and calculating circuit 204 is in a high level state, the respective gating circuit 203a or 203b is switched on to cause data stored in the respective digital memory circuit 202a or 202b to be outputted to the control and calculating circuit 204. The signal line a will be in a high level state during the passive AF, and the output from the digital memory circuit 202a is inputted to the control and calculating circuit 204. During the active AF, the output from the digital memory circuit 202b is inputted to the control and calculating circuit 204. The control and calculating circuit 204 is operable to perform in a well known manner a calculation on the basis of the outputs from the line sensors 200a and 200b to determine the current focusing condition, that is, the defocus amount and the defocus direction. Reference numeral 205 represents a subtractor adapted to receive the defocus amount Δl and the defocus direction±, both outputted from the control and calculating circuit 204, and a correction data c outputted from a selector circuit 219, which correction data is associated with the aberration (spherical aberration) of the photo-taking lens, so that the correction data c can be subtracted relative to the defocus amount ΔL and can be outputted together with the direction signal±. Reference numeral 206 represents an adder adapted to receive both of the defocus amout ΔL and the defocus direction signal±, outputted from the control and calculating circuit 204, and the correction data c outputted from the selector circuit 219 associated with the aberration (spherical aberration) of the photo-taking lens. The correction data c is added to the defocus amount Δl and is then outputted together with the direction signal±. Reference numeral 207 represents a selector circuit adapted to receive both the output from the subtractor 205 and the output from the adder 206 and is imparted wih either a positive signal or a negative signal by the selector circuit 219. Selector circuit 207 is so constructed and so operable that, if the negative signal is applied thereto, the output data and the signal from the subtractor 205 can be selected and outputted, but if the positive signal is applied thereto, the output data and the signal from the adder 206 can be selected and outputted. The calculated defocus amount ΔL is inputted to both a multiplier 213 and a display comparator 210. The multiplier 213 is supplied with a conversion coefficient K from a register 214, said conversion coefficient K being for the purpose of focus adjustment. This conversion coefficient K contains information concerning a mechanical structure of a lens drive system necessary to obtain the amount of movement of the lens corresponding to the defocus amount ΔL, and the number of revolutions N of the motor for driving the lens can be obtained by multiplying the defocus amount ΔL by the conversion coefficient K. Signals representative of data of the number of revolutions N of the motor and the direction of revolution are applied to a motor drive circuit 215. Reference numeral 210 represents the display comparator to which the defocus amount ΔL and in-focus zone data from an infocus zone data circuit 211 are supplied, the comparator 210 being operable to compare both of these data and then to output either an in-focus data or an out-of-focus data. Reference numeral 212 represents a display circuit adapted to receive both the output from the display comparator 210 and the defocus direction signal outputted from the selector circuit 207 and then to effect a display of either the in-focus condition or the out-of-focus condition in the event of occurrence of an out-of-focus condition. As hereinbefore described, the number of revolutions N of the motor and the signal indicative of the direction of revolution of the motor are applied to motor drive circuit 215, and in accordance with this information a lens drive motor M is driven. The revolution of the motor M can be transmitted to a drive shaft DA through a gear train, shown by the phantom line GT, and then through a slip mechanism SL. At a position following the slip mechanism SL, there is disposed an encoder comprised of a photo-coupler PC for monitoring the rotor drive shaft DA and for feeding a signal indicative of the rotation of the drive shaft DA back to the motor drive circuit 215 so that the motor M can be driven a predetermined number of revolutions N. Reference numeral 216 represents a trigger circuit for generating a focus detection start signal in dependence on an ON and OFF condition of the shutter button or a separately provided switch, a signal of which is outputted to the control and calculating circuit 204. Reference numerals 217 and 218 represent respective registers to which two correction data Ca and Cb concerning the aberration of the photo-taking lens are applied from a reader circuit RD (See FIG. 8). The correction data Ca represents the amount of correction $\Delta SB_1$ during the passive AF whereas the correction data Cb represents the amount of correction $\Delta SB_2 + IR$ during the TTL active AF. The selector circuit circuit 219 is applied with outputs from the respective registers 217 and 218 and also with either a positive signal or a negative signal fed from the control and calculating circuit 204 through a signal line d. In the selector circuit 219, if the positive signal is applied, the output data Ca from the register 217 is selected and outputted, but if the negative signal is applied, the output data Cb from the register 218 is selected and outputted.

While the circuit arrangement on the side of the camera body is such as hereinbefore described, that on the side of the interchangeable lens will now be described. In FIG. 7, the interchangeable lens IL is shown by the phantom block in the lower left portion of FIG. 7, and is shown as used in the form of, for example, a zoom lens. The interchangeable lens IL has a zooming ring ZR manually operated in a zooming operation, said zooming ZR being operatively coupled with a brush BR rotatable together therewith. In correspondence with the brush BR, a fixed portion of a lens barrel (not shown) is provided with a code plate CD from which a digital code signal descriptive of the setting of a focal length, that is, the focus length selected by the rotation of the zooming ring ZR, can be generated. The code signal is adapted to be inputted into a lens information output circuit LID including a read-only memory and provided in the interchangeable lens. A particular address in the read-only memory including in the lens information output circuit LID is specified by the digital code signal and, upon the start of the reading performed by the reader circuit RD in the camera body, the correction data Ca and Cb concerning the aberration of the photo-taking lens and the conversion coefficient K for the number of revolutions of the motor are read out from the lens information output circuit LID and then transferred to the registers 217, 218 and 214. The respective values of the correction data Ca and Cb are updated according to the zooming operation of the photo-taking lens and are then outputted from the reader circuit RD. Terminals between the camera body and the interchangeable lens include an electric power supply terminal, a synchro clock pulse terminal, a read-out signal terminal, a serial data terminal and a ground terminal. For the purpose of driving a focusing lens, a driven shaft FD is engaged or otherwise meshed with a focusing ring FR.

With the above described construction, the system operates in the following manner.

When the interchangeable lens IL is mounted on the camera body, the lens information output circuit LID and the reader circuit RD are connected with each other through the terminals and, at the same time, the ground terminals are also connected with each other. Also, a mechanical engagement takes place between the drive shaft DA and the driven shaft FD for moving the focusing lens. When the photographer subsequently touches the shutter button or the like in readiness for the focus adjustment, an electric power is first supplied from the reader circuit RD to the lens information output circuit LID through the electric power supply terminal, and the contents of the readonly memory are read out from the lens information output circuit LID in correspondence with read-out signals at the synchro clock pulse terminals and the read-out signal terminals with the correction data Ca and Cb consequently being loaded into the respective registers 217 and 218 and also with the data of the conversion coefficient K loaded into the registers 214. This read-out operation continues at a predetermined sequence to permit the data to be updated from time to time. The contents of the read-only memory read out in the manner as hereinabove described are determined by the address specified by the digital code of the code plate CD determined by the position of the brush BR that moves with the setting of the zooming ring ZR. By way of example, since even though the aberration varies with changes in focal length of the zoom lens, the correction values Ca and Cb are correspondingly included in the contents of the read-only memory and the data of the correction values Ca and Cb can be loaded in the registers 217 and 218 through the lens information output circuit LID and the reader circuit RD in dependence on the zooming operation. Upon the complete transfer of the data to the registers 217 and 218, a CCD drive pulse is applied rom the control and calculating circuit 204 to the CCD drive circuits 201a and 201b through the signal line e. The CCD drive circuits 201a and 201b produce the CCD drive start signals to the focus detecting line sensors 200a and 200b in response to the CCD drive pulse. Analog signals generated from the charge-coupled devices are converted into associated digital signals by respective analog-to-digital converters provided in the CCD drive circuits 201a and 201b. The digital signals so converted are in turn transferred to and stored in the respective digital memory circuit 202a and 202b. On the other hand, a light measuring circuit 220 keeps applying through a signal line f to the control and calculating circuit 204 information descriptive of the brightness of the object to be photographed. Based on the measured light value outputted from the light measuring circuit 220, the control and calculating circuit 204 starts to integrate signals outputted from the focus detecting line sensors and, at the same time, outputs a firing signal to a firing circuit through a signal line g to energize the light emitting diode (shown by 16 in FIG. 2) in the event that the measured light value is lower than a predetermined level. The rays of light emitted from the light emitting diode are projected towards the object to be photographed after having passed through a portion of the photo-taking lens. The control and calculating circuit 204 outputs a low level signal to the gating circuit 203a through the signal line a, and also a high level signal to the gating circuit 203b through the signal line b.

Accordingly, the gating circuits 203a and 203b are switched off and on, respectively, allowing the output from the digital memory circuit 202b to be applied to the control and calculating circuit 204. Also, the control and calculating circuit 204 outputs the negative signal to the selector circuit 219 through the signal line d and, therefore, the correction data Cb stored in the regiser 218 and concerning the aberration of the photo-taking lens is selected and outputted from the selector circuit 219. In contrast thereto, in the event that the measured light value outputted from the light measuring circuit 220 is higher than the predetermined level, the signal line g is rendered to be a in a low level state and the light emitting diode will not be energized to emit light. The control and calculating circuit 204 also outputs a high level signal to the gating circuit 203a through the signal line a and a low level signal to the gating circuit 203b through the signal line b and, therefore, the gating circuits 203a and 203b are switched on and off, respectively, with the consequence that the output from the digital memory circuit 202a is outputted to the control and calculating circuit 204. Furthermore, since the control and calculating circuit 204 outputs the positive signal to the selector circuit 219 through the signal line d, the correction data Ca stored in the register 217 and concerning the aberration of the photo-taking lens is selected and outputted from the selector circuit 219. When the output from one of the digital memory circuits 202a and 202b is inputted into the control and calculating circuit 204 in this way, the control and calculating circuit 204 calculates the data, inputted thereto, according to a predetermined algorithm to determine the defocus amount ΔL and the defocus direction signal, that is, either (+) or (−), from the phase difference of correlation signals of the focus detecting line sensors. The defocus amount ΔL and the defocus direction signal are inputted to the subtractor 205 and the adder 206. On the other hand, the correction data Ca or Cb are outputted from the selector circuit 219 and inputted to one input terminal of each of the subtractor 205 and the adder 206. In addition to the correction data Ca or Cb, a correction direction signal either (+) or (−) is applied to the selector circuit 207 from the selector circuit 219. Then, in accordance with the correction direction signal outputted from the selector circuit 219, the data and signal from the subtractor 205 or the data and signal from the adder 206 are taken in the selector circuit 207. If, for example, the correction direction signal output by the selector 219 is the (−) signal, the data and signal from the subtractor 205 is input to the selector circuit 207, while if the correction direction signal is the (+) signal, the data and signal from the adder 206 is input to the selector circuit 207. The calculated data ΔL becomes the defocus amount of the photo-taking lens which is in turn applied to both of the multiplier 213 and the display comparator 210, said multiplier 213 multiplying the calculated data by the conversion coefficient K for the motor revolution number to provide a revolution data N which is then applied to the motor drive circuit 215. On the other hand, the disaply comparator 210 performs a comparison between the defocus amount data ΔL and the data fed from the in-focus zone data circuit 211 and lights an in-focus display element if the data ΔL falls within a predetermined in-focus zone. Furthermore, the signal descriptive of the defocus direction is applied to both of the motor drive circuit 215 and the display circuit 212 from the selector circuit 207, and either a left-hand defocus display element or a right-hand defocus display element is lit to display the direction of revolution of the motor M and the defocus condition. The motor M is driven according to the data of the number of revolutions N of the motor M and the direction of revolution of the motor M. The rotation of the motor is transmitted to the drive shaft DA through the gear train GT and the slip mechanism SL and then to the focusing ring FR through the driven shaft FD in the interchangeable lens IL thereby causing the photo-taking lens to move a distance corresponding to the defocus amount ΔL' in a direction axially of the optical axis of the photo-taking lens. The rotation of the drive shaft DA is monitored by the encoder PC comprised of the photo-coupler and is fed back to the motor drive circuit 215 for accurate control of the number of revolutions thereof.

Figure 8:
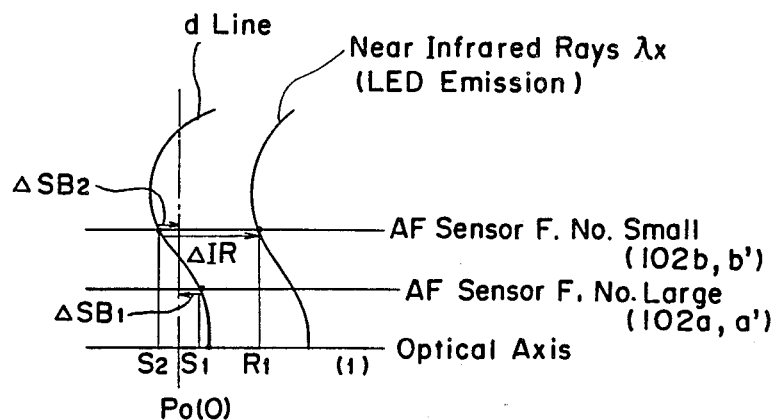
FIG. 8 is a chart showing a spherical aberration and a chromatic aberration of the photo-taking lens.
Figure 9:
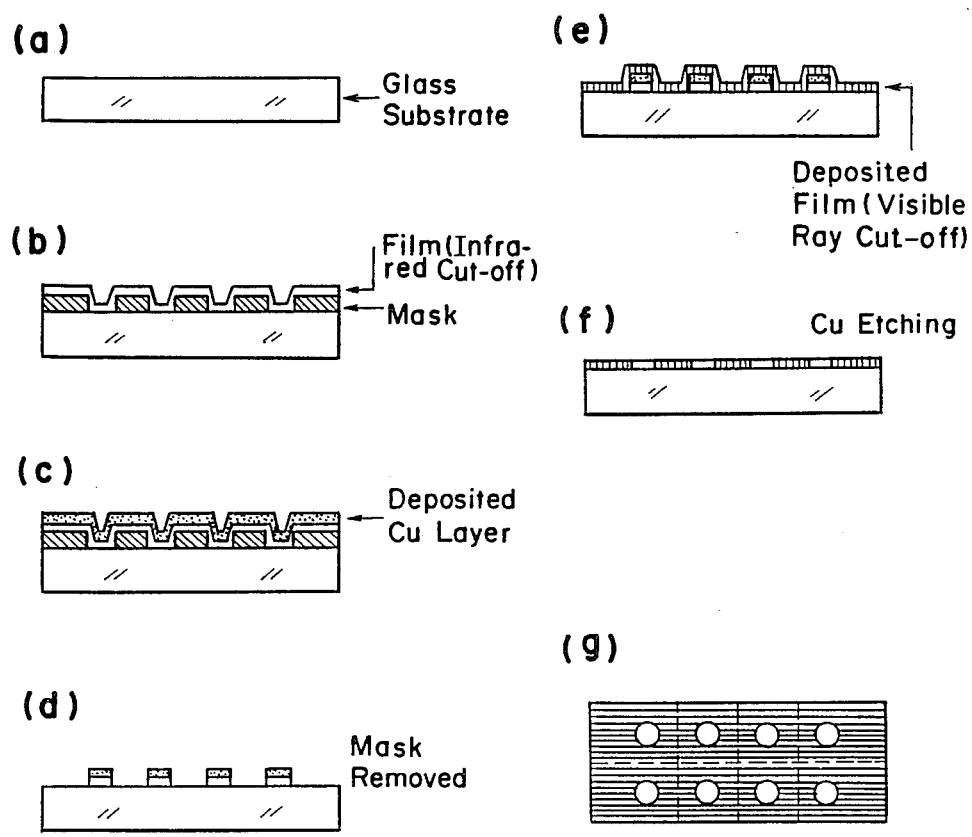
FIGS. 9(a)–9(g) are diagrams illustrating the sequence of manufacture of an optical filter according to the present invention.
Figure 10:
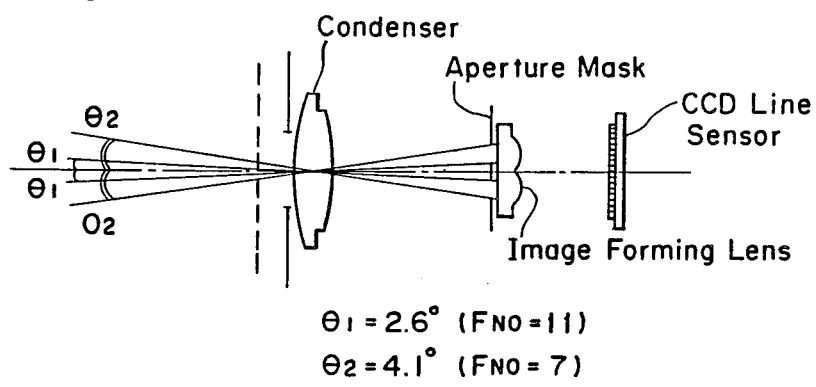
FIG. 10 is a schematic side sectional view showing the focus detecting optical system.
Figure 12:
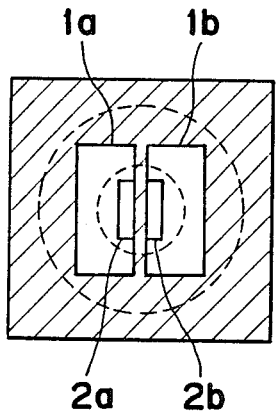
FIG. 12 is a diagram illustrating the light dividing means shown as projected on a plane of the exit pupil of the photo-taking lens.
Figure 11:
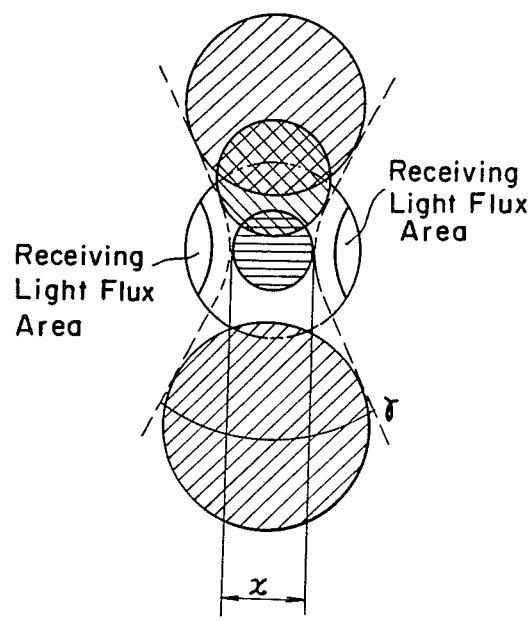
FIG. 11 is a diagram illustrating the harmful light caused by the photo-taking lens, which is shown as projected on a plane of the aperture mask.
Figure 13:
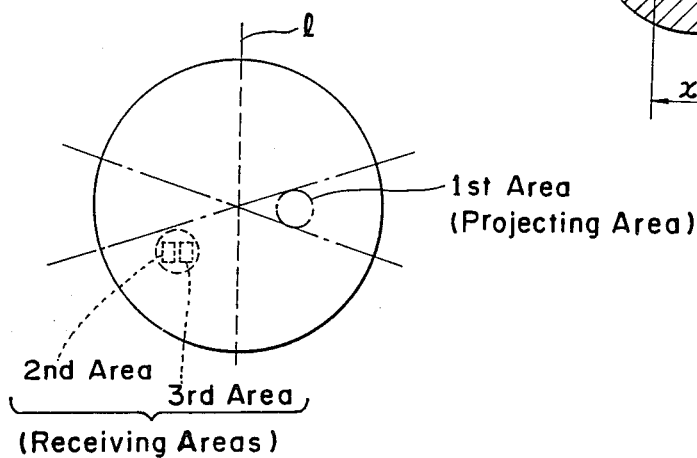
FIG. 13 is a diagram illustrating the relationship between the projecting light region and the receiving light region in the prior art system.

FIG. 8 illustrates the spherical aberration and the longitudinal chromatic aberration of the phototaking lens, shown together with AF correction values required to correct the aberrations.

A line bearing "AF Sensor F.No. Small" corresponds to the outer pair of the aperture openings 102b and 102b' and a line bearing "AF Sensor F.No. Large" corresponds to the inner pair of the aperture openings 102a and 102a', which aperture openings are shown in FIG. 1(a). Reference character λx represents the wavelength of light emitted from the light emitting diode which is a light source during the active AF. A d line represents rays of light representative of the visible rays of light, and the two curves shown in FIG. 8 illustrate respective spherical aberrations of the photo-taking lens at different wavelengths d line and λx.

The symbol ΔSB1 represents the difference between a best image plane Po on the optical axis and an infocus (detection) position $S_1$ detected by an AF sensor when the aperture opening is the inner pair of the aperture openings 102a and 102a'.

This difference $\Delta SB_1$, as well as $\Delta SB_2$ which will be described later, varies with the degree of spherical aberration of the photo-taking lens and a condition for the correction.

The difference $\Delta SB_2$ represents the difference between the best image plane Po on the optical axis Po and the point $S_2$ detected by the AF sensor as the in-focus position when the aperture opening is the outer pair of the aperture openings 102b and 102b'.

The symbol $\Delta IR$ represents the difference between the point $S_2$ and the point $R_1$ detected by the AF sensor as the in-focus position (when the aperture opening is the outer pair of the aperture openings 102b and 102b').

These differences $\Delta SB_1, \Delta SB_2$ and $\Delta IR$ are all stored in the read-only memory in the photo-taking lens and read out for actual use when the necessity arises.

The relationship between the AF modes and the amount of correction of the aberration is illustrated in the following table.

$$\frac{\alpha \Delta SB_1 + (\Delta SB_2 + \Delta IR)}{\alpha + \beta} \times k$$

The active AF (2) is the case wherein the focus detection is carried out with the use of both the near infrared rays of light and the visible rays of light.

During this active AF(2) mode, the correction data Ca and Cb are inputted to the control and calculating circuit 204 through the selector circuit 219 unlike that described with reference to FIG. 7. In this control and calculating circuit 204, the defocus amount $\Delta L$ is calculated based on the signal, inputted through the digital memory circuit 202b, and the reslt of the calculation associated with the aberration, the calculated defocus amount being subsequently outputted to the display circuit 210 and the multiplier 213. Thereafter, a similar operation to that described with reference to FIG. 7 takes place and therefore no further description will be

|  | Sensor F. No. Large (inner) | Sensor F. No. Small (outer) | Amount of Correction of Aberration of Photo-taking Lens Correction Amount (Spherical & Chromatic Aberration) |
| --- | --- | --- | --- |
| Passive | $\Delta SB_1$ |  | $SB_1$ |
| Active (1) (with infrared light) |  | $\Delta SB_2 + \Delta IR$ | $\Delta SB_2 + \Delta IR$ |
| Active (2) (with infrared light + visible light) | $\Delta SB_2$ | $\Delta SB_2 + \Delta IR$ | $\dfrac{\alpha \Delta SB_1 + (\Delta SB_2 + \Delta IR)}{\alpha + \beta} \times k$ |

Note:
Active (1) is the case in which AF is carried with the use of the near infrared light having passed through the outer pair of the aperture openings 102b and 102b'. (Visible light cut-off filter is placed in front of the focus detecting line sensor).
Active (2) is the case in which AF is carried out with the use of the near infrared rays of light having passed through the outer pair of the aperture openings 102b and 102b' and the visible rays of light having passed through the inner pair of the aperture openings 102a and 102a'.
$\alpha$ represents the amount of visible light incident upon the line sensor after having passed through the inner pair of the aperture openings (when LED is not lit), and $\beta$ represents the amount of near infrared light incident upon the line sensor after having passed through the outer pair of the aperture openings (Output when LED is lit minus output when LED is not lit). k represents a suitable constant for the correction (normally, 1).

By way of example, if the object to be photographed is bright and has a contrast sufficient for the focus detection, the AF mode would be the passive AF and the focus detection is carried out with the use of the rays of light which have passed through the aperture openings 102a and 102a' for AF Sensor F.No. Large, while the difference SB1 is read out and used as the amount of correction of the aberration.

In contrast thereto, if the object is so dark that no sufficient signal output can be obtained, the AF mode would be switched over to the active AF.

During the active AF(1) (a in which case, a visible light cut-off filter is disposed in front of the focus detecting line sensor 106), the focus detection is carried out with the use of near infrared rays of light which have passed through the outer pair of the aperture openings 102b and 102b' for AF Sensor F.No. Small, and the sum of the differences $\Delta SB2$ and $\Delta IR$ is selected for use as the amount of correction of the aberration.

During the active AF (2), the amount of light incident upon the focus detecting line sensor 106 is measured by a monitor disposed adjacent the line sensor 106. Then, an output of signal light $\beta$ which depends only on the light emitting diode, and an output $\alpha$, which is generated when the light emitting diode is not lit, are individually read out. $\Delta SB_1$ and $\Delta SB_2 + \Delta IR$ are selected as the amount of correction of the aberration; and those are used to determine the following equation.

reiterated for the sake of brevity.

FIGS. 9(a) to (g) illustrate the sequence of manufacture of an optical filter having a central portion exhibiting a near infrared cut-off characteristic and a peripheral portion exhibiting a visible light cut-off characteristic. In order for the optical filter to have the different characteristics at the central and peripheral portions thereof, the patterning of dielectric multilayered films is carried out in the following manner.

A perforated mask having a central circular opening for the subsequent formation of the near infrared cut-off filter is placed and positioned on a glass substrate, and the near infrared cut-off filter is then vapor-deposited thereover (Steps (a) and (b)). Thereafter, a metallic thin film (in which Cu is used) is vapor-deposited thereover (Step (c)). After the formation of the metallic thin film, the mask is removed, leaving circular portions on the substrate, each circular portion being comprised of a multilayer having a property of cutting off the infrared light and also having a Cu layer deposited thereover (Step (d)). Subsequently, a multi-layer having a property of cutting off the visible rays of light is formed by the use of a vapor-deposition technique (Step (e)). The metallic thin film is then dissolved by the use of an etching solution for the removal thereof (Step (f)) thereby to leave the optical filter having the near infrared cut-off characteristic at the central portion thereof and the visible light cut-off characteristic at the peripheral portion thereof. The resultant optical filter is cut along a predetermined line to a desired size, thereby completing the filter such as shown in FIG. 1(b).

From the foregoing description of the present invention, it is clear that the focus detecting apparatus according to the present invention brings about the following advantages.

(1) Since the near infrared cut-off filter adjacent the inner pair of the pupil areas is formed on the same substrate as the visible light cut-off filter, no error would occur in the distance measurement under the back lighting condition during the active AF with a simple construction.

(2) Since the receiving light region is set at a position symmetrical relative to the optical axis of the photo-taking lens and lying on the line containing the optical axis of the photo-taking lens and perpendicular to a straight line connected between the optical axis of the photo-taking lens and the light projecting optical axis, the active AF is possible even with a relatively low speed lens having a larger minimum F-number.

(3) Since arrangement has been made such that during the passive AF the rays of light having passed through the inner pair of the aperture openings can be received, the provision of the active AF permits any one of the available interchangeable lenses to be usable during the passive AF.

(4) Since arrangement has been made such that the rays of light having passed through the inner pair of the pupil areas can be received through the near infrared cut-off filtre while the rays of light having passed through the outer pair of the pupil areas can be received through the visible light cut-off filter and such that both of the above mentioned filters are formed on the same substrate, the AF light receiving system can be rendered to be very compact andsimple.

Although the present invention has fully been described in connection with the preferred embodiment thereof with reference to the accompanying drawings, it is to be noted that various changes and modifications are apparent to those skilled in the art. Such changes and modifications are to be understood as included within the scope for the present invention as defined by the appended claims unless they depart therefrom.

We claim:

1. A focus detecting apparatus for detecting the focusing condition of a photo-taking lens, comprising:
   means for projecting light having a predetermined wavelength range toward an object to be focused through the photo-taking lens, the projected light having a projection optical axis different from the optical axis of the objective lens;
   means, located at the image side of a predetermined focal plane of the photo-taking lens, for forming a secondary image of an image formed on the predetermined focal plane by the phototaking lens;
   means, located nearby the secondary image forming means, for limiting light passed therethrough, the light limiting means including an aperture mask having a pair of aperture openings, each of the aperture openings being positioned in a symmetrical arrangement with respect to the optical axis of the photo-taking lens and lying on a line which includes the optical axis of the photo-taking lens and which is perpendicular to another line connecting the optical axis of the photo-taking lens with the projection optical axis, and the pair of the aperture openings being defined by a pair of inner regions and a pair of outer regions;
   means, located at optical paths passed through the inner regions of the aperture openings, for cutting off light having the predetermined wavelength range; and
   means, located at a predetermined focal plane of the secondary image forming means, for receiving light passed through the secondary image forming means, the light limiting means, and the light cutting off means.

2. A focus detecting apparatus according to claim 1, further comprising a first means for detecting the focusing condition of the photo-taking lens on the basis of a light receiving condition of light passed through the inner regions of the aperture openings without actuating the light projecting means, and a second means for detecting the focusing condition of the photo-taking lens on the basis of the light receiving condition of light passed through the outer regions of the aperture openings with actuating the light projecting means.

3. A focus detecting apparatus according to claim 2, wherein the light projecting means projects light having a wavelength range of about 670 nm to 950 nm.

4. A focus detecting apparatus according to claim 1, wherein the light receiving means includes first means, located at a predetermined focal plane of the secondary image forming means, for receiving light passed through the inner regions of the aperture openings, second means, located at the predetermined focal plane of the secondary image forming means, for receiving light passed through the outer regions of the aperture openings, and means, located in front of the first receiving means, for cutting off light having the predetermined wavelength range.

5. A focus detecting apparatus according to claim 4, further comprising means, located in front of the second receiving means, for cutting off the visible light.

6. A focus detecting apparatus according to claim 1, further comprising means, located at optical paths through the outer regions of the aperture openings, for transmitting light having the predetermined wavelength range.

7. A focus detecting apparatus according to claim 6, wherein the light cutting off means and the light transmitting means are filters formed on an identical substrate.

8. A focus detecting apparatus according to claim 6, wherein the light receiving means includes first means, located at a predetermined focal plane of the secondary image forming means, for receiving light passed through the inner regions of the aperture openings, second means, located at the predetermined focal plane of the secondary image forming means, for receiving light passed through the outer regions of the aperture openings, and means, located in front of the first receiving means, for cutting off light having the predetermined wavelength range.

9. A focus detecting apparatus according to claim 8, further comprising means, located in front of the second receiving means, for cutting off the visible light.

10. A focus detecting apparatus for detecting the focusing condition of a photo-taking lens, comprising:
    means, located at the image side of a predetermined focal plane of a photo-taking lens, for forming a secondary image of an image formed on the predetermined focal plane by the phototaking lens;

means, attached to the secondary image forming means, for limiting light passed therethrough, the light limiting means including an aperture mask having a pair of aperture openings each of the aperture openings being positioned in a symmetrical arrangement with respect to the optical axis of the photo-taking lens, and the pair of the aperture openings being defined by a pair of inner regions and a pair of outer regions;

first means, located at optical paths passed through the inner regions of the aperture openings for cutting off light having a predetermined wavelength range;

second means, located at optical paths passed through the outer regions of the aperture openings, for cutting off the visible light;

first means, located at a predetermined focal plane of the secondary image forming means, for receiving light cut off the predetermined wavelength range by the first light cutting off means; and second means, located nearby the first light receiving means and at the predetermined focal plane of the secondary image forming means, for receiving light cut off the visible light by the second light cutting off means.

* * * * *